US011087568B2

(12) United States Patent
Deshmukh et al.

(10) Patent No.: US 11,087,568 B2
(45) Date of Patent: *Aug. 10, 2021

(54) PRIVACY-AWARE SIGNAL MONITORING SYSTEMS AND METHODS

(71) Applicant: TOYOTA MOTOR ENGINEERING & MANUFACTURING NORTH AMERICA, INC., Plano, TX (US)

(72) Inventors: Jyotirmoy V. Deshmukh, Torrance, CA (US); James P. Kapinski, Redondo Beach, CA (US); Xiaoqing Jin, Torrance, CA (US); Luan V. Nguyen, Torrance, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,766

(22) Filed: Feb. 3, 2020

(65) Prior Publication Data

US 2020/0175780 A1    Jun. 4, 2020

Related U.S. Application Data

(63) Continuation of application No. 15/476,642, filed on Mar. 31, 2017, now Pat. No. 10,580,225.

(51) Int. Cl.
*G07C 5/00* (2006.01)
*G07C 5/08* (2006.01)
*H04L 29/06* (2006.01)

(52) U.S. Cl.
CPC ........... *G07C 5/006* (2013.01); *G07C 5/0808* (2013.01); *H04L 63/0428* (2013.01); *G07C 5/008* (2013.01)

(58) Field of Classification Search
CPC ...... G07C 5/006; G07C 5/0841; G07C 5/008; G07C 5/00; G07C 5/08; H04L 63/0428; H04L 29/06; H04L 63/04; H04L 63/00; H04L 29/02; G06F 21/00
See application file for complete search history.

(56) References Cited

U.S. PATENT DOCUMENTS 9,037,860 B1 *   5/2015   Kerschbaum ....... G06F 21/6227
                                                     713/168
9,516,053 B1 *  12/2016   Muddu ................. H04L 41/145
(Continued)

*Primary Examiner* — Quazi Farooqui
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for monitoring time-series data relative to a temporal logic specification regarding expected behavior of a system, such as a vehicle. The time-series data and a threshold value(s) specified in the temporal logic specification may be encrypted and analyzed without decrypting the time-series data to maintain the privacy of a user(s) of the vehicle. Encryption of the time-series data and the threshold value(s) may be accomplished using an order preserving encryption scheme. Analysis of the time-series data may be accomplished utilizing a batch processing-type architecture or a continuous processing-type architecture. When utilizing the continuous processing-type architecture, historical time-series data may be stored and utilized to determine whether currently-monitored time-series data satisfies the temporal logic specification.

18 Claims, 5 Drawing Sheets

(56) References Cited

U.S. PATENT DOCUMENTS

| | | | |
|---|---|---|---|
| 2006/0126829 A1* | 6/2006 | Lai | G09C 5/00 |
| | | | 380/28 |
| 2011/0060918 A1* | 3/2011 | Troncoso Pastoriza | |
| | | | G06F 21/72 |
| | | | 713/189 |
| 2012/0038473 A1* | 2/2012 | Fecher | H02J 7/0021 |
| | | | 340/455 |
| 2017/0293913 A1* | 10/2017 | Gulak | G16H 10/60 |

* cited by examiner

RECEIVING TIME-SERIES DATA REPRESENTATIVE OF A CHARACTERISTIC OF A SYSTEM THAT HAS BEEN ENCRYPTED ACCORDING TO AN ENCRYPTION SCHEME
200

COMPARING THE ENCRYPTED TIME-SERIES DATA WITH A SPECIFICATION INDICATIVE OF ONE OR MORE EXPECTED BEHAVIORS OF THE SYSTEM
202

DETERMINING, BASED UPON THE COMPARISON, WHETHER THE CHARACTERISTIC OF THE SYSTEM COMPORTS WITH THE ONE OR MORE EXPECTED BEHAVIORS OF THE SYSTEM
204

OUTPUTTING ONE OR MORE NOTIFICATIONS BASED UPON THE DETERMINATION
206

FIG. 2

PRIVACY-AWARE SIGNAL MONITORING SYSTEMS AND METHODS

CROSS REFERENCE TO RELATED APPLICATIONS

This application is a continuation of U.S. patent application Ser. No. 15/476,642, filed on Mar. 31, 2017, the entire contents of which are incorporated herein by reference in its entirety for all purposes.

TECHNICAL FIELD

The present disclosure relates generally to processing encrypted data, and in particular, some embodiments relate to analyzing encrypted data without deciphering or decrypting the encrypted data. The encrypted data may be time-series data, and analyzing the encrypted data may comprise comparing the encrypted data to encrypted specification data in order to monitor a system's performance for various purposes, such as for making predictive maintenance judgments.

DESCRIPTION OF RELATED ART

Monitoring and/or gathering of data has become ubiquitous in modern society, ranging from the gathering of users' personal health data via fitness trackers to obtaining location data associated with users' of ride-sharing applications. Security concerns surround the gathering of data as well as the sharing of that gathered data. For example, gathered data can be tampered with or used in unscrupulous ways resulting in undesirable consequences for a user associated with the gathered data. One security concern that users are particularly sensitive to is privacy. Privacy violations can lead to many problems, such as personal safety concerns, anti-consumer marketing practices, and violations of civil liberties. Because of these concerns, users and those entities or services that gather/share data have a vested interest in ensuring that any data gathered (and/or generated) from user devices or systems remains private. Despite these concerns, however, users often demand services that require their data to be processed and analyzed, whether locally or remotely (e.g., in the cloud), potentially leading to privacy breaches.

BRIEF SUMMARY OF THE DISCLOSURE

In accordance with one embodiment, a method comprises receiving time-series data representative of a characteristic of a system that has been encrypted according to an encryption scheme. The encrypted time-series data can be compared with a specification indicative of one or more expected behaviors of the system. Based upon the comparison, it can be determined whether the characteristic of the system comports with the one or more expected behaviors of the system. One or more notifications can be output based upon the determination.

The time-series data may comprise a sequence of values associated with one or more signals generated by the system and monitored over a period of time. The encrypting of the time-series data may comprise mapping each of the sequence of values to one of a plurality of random values. One or more threshold values set forth in the specification may be encrypted by mapping the one or more threshold values to other random values of the plurality of random values. In some embodiments, an ordered relationship between each of the sequence of values can be maintained after encryption. In some embodiments, an ordered relationship between each of the sequence of values and the one or more threshold values is maintained after encryption.

The encrypted time-series data can be compared with the one or more encrypted threshold values commensurate with a temporal logic formula defining the one or more expected behaviors of the system. The encryption scheme may comprise an order preserving encryption scheme. At least one of the comparing and the determining operations may be performed by one or more processors local to the system or one or more processors remotely located from the system. The one or more remotely located processors may comprise a non-decrypting cloud server.

The method may further comprise transmitting the encrypted time-series data and an encrypted threshold value specified in the specification to the non-decrypting cloud server in batches of encrypted packets. In some embodiments, the method may comprise continuously transmitting the encrypted time-series data to the non-decrypting cloud server as a stream of encrypted time-series data. In some embodiments, the comparing operation further comprises accounting for historical encrypted time-series data obtained during previous monitoring of the system.

In some embodiments, the encrypting of the time-series data comprises mapping each of the sequence of values to one of a plurality of random values. The plurality of random values can be representative of a range of foreseeable values to which the sequence of values is mappable. Moreover, a predictive maintenance judgment regarding the system can be generated, wherein the one or more notifications comprise one or more recommendations regarding predictive maintenance actions to put the system in compliance with the predictive maintenance judgment.

In accordance with one embodiment, a system may comprise an analysis component adapted to analyze a sequence of time-series data in accordance with one or more specifications indicative of one or more expected behaviors of the vehicle. The one or more specifications may specify one or more threshold values. The sequence of time-series data and the one or more threshold values can be encrypted by a user device adapted to monitor one or more operating characteristics of the vehicle.

The analysis component may transmit a predictive maintenance judgment from the analysis component to the user device regarding the one or more operating characteristics of the vehicle prompting one or more notifications to be generated, the one or more notifications indicating one or more suggested actions to be undertaken to put the vehicle in compliance with the one or more expected behaviors of the vehicle.

The analysis component may be implemented in a non-decrypting cloud server remotely located from the vehicle. The user device may comprise a data encryption component adapted to generate the encrypted sequence of time-series data and the one or more encrypted threshold values. The user device may further comprise an encryption table initialization component. The encryption table initialization component can create an encryption table utilized by the data encryption component to generate the encrypted sequence of time-series data and the one or more encrypted threshold values. The encryption table initialization component generates the encryption table in accordance with randomized values to which the sequence of time-series data and the one or more threshold values are mapped by the data encryption component.

The encryption table initialization component may generate the encryption table based on a range of randomized values encompassing all possible values representative of the one or more operating characteristics of the vehicle, and to which the sequence of time-series data is mapped by the data encryption component.

A data store can store encrypted versions of previously monitored time-series data indicative of the one or more operating characteristics of the vehicle. The analysis component may further analyze the encrypted sequence of time-series data in accordance with the one or more specifications relative to the encrypted versions of the previously monitored time-series data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a flow chart illustrating example operations that can be performed to encrypt and analyze time-series data in accordance with various embodiments of the present disclosure.

Figure 1:
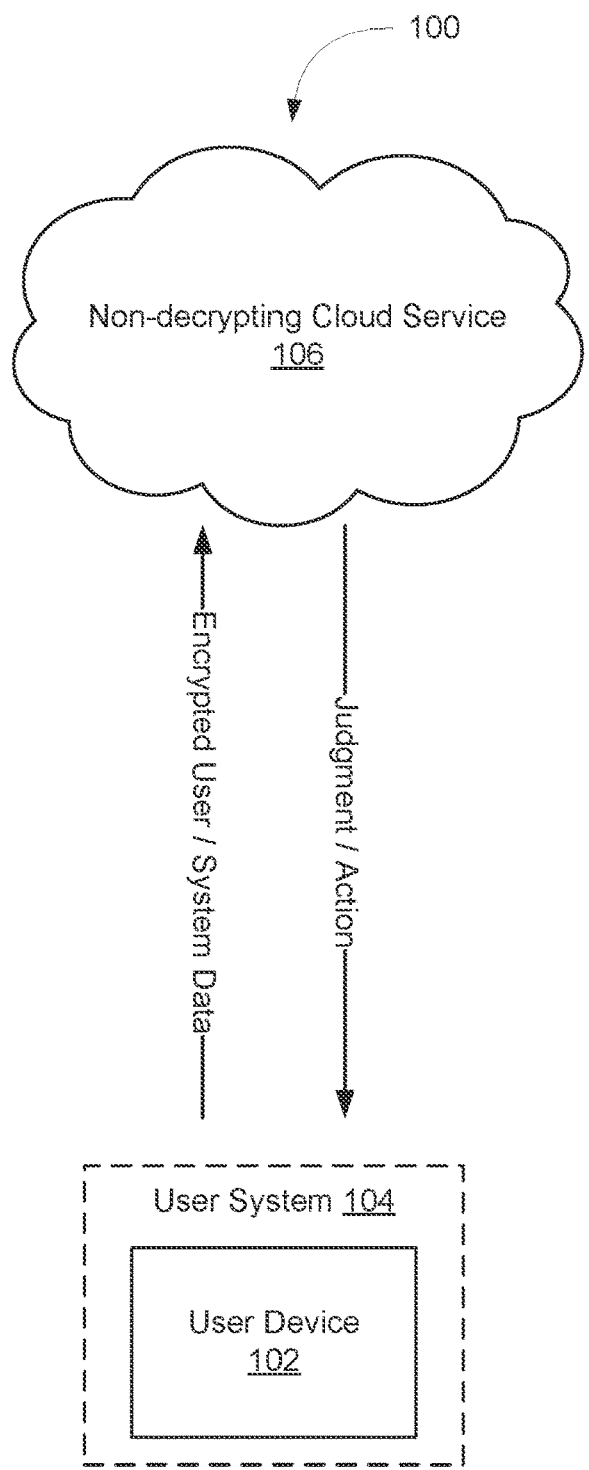
FIG. 1 is a schematic representation of an example privacy-aware predictive maintenance system in accordance with various embodiments of the present disclosure.

The figures are not exhaustive and do not limit the present disclosure to the precise form disclosed.

DETAILED DESCRIPTION

Embodiments of the systems and methods disclosed herein can provide privacy-aware monitoring of systems based on data received from those systems. The received data can be analyzed in order to suggest predictive maintenance actions. The received data can be encrypted, and the analysis and/or monitoring can be performed without requiring that the data be decrypted. For example, in some embodiments, the data is encrypted time-series data that can be compared to encrypted threshold (e.g., baseline) data to determine the health of the system being monitored. The manner of encryption can preserve the relative order and/or relative differences between the encrypted time-series data and the encrypted threshold data. For example, time-series data values and threshold data values can be encrypted by being mapped to random values that are ordered in the same way the time-series and threshold data values would be ordered. This preserves the privacy of the time-series and threshold data values as well as their relationship(s) to each other, and also allows the encrypted time-series and threshold data to be analyzed relative to each other. A temporal logic specification or set of conditions can be created setting forth how the encrypted time-series and threshold data is to be analyzed in order to determine whether or not the data reflects a need for predictive maintenance.

As alluded to above, security concerns surround data gathering and data sharing applications or services. Predictive maintenance is one example of a data gathering and sharing application or service in which security concerns can arise. Predictive maintenance can involve determining that a fault will (or is likely to) occur in a system at some point in the future. In some scenarios, predictive maintenance can be performed locally on a device, e.g., the device at which data has been gathered or monitored. In other applications, the predictive maintenance processing and decision-making might be performed remotely, resulting in data being transferred from the device to a remote processing application. For example, signal processing used to perform predictive maintenance in some applications may be of a sufficiently high level of complexity that the processing and decision-making is performed remotely. As a further example, due to lack of processing power in local devices, a cloud-based service or other remote monitoring device may instead be utilized to analyze data that has been monitored and/or gathered by local devices.

Signals indicative of the operational characteristics or performance of a system can be monitored and processed for the purposes of performing predictive maintenance. Signal monitoring may automate the process of checking system behaviors against given specifications in real-time, e.g., during system operation. In addition to performing predictive maintenance, signal monitoring can be used to automate testing processes, as well as to determine when system faults occur in real-time. Signal monitoring can be employed locally (for example, on a deployed consumer device) or remotely (for example, utilizing cloud-based processing).

Some encryption technologies may provide information security safeguards, such as secrecy, while some are designed specifically to protect privacy. Various embodiments of the systems and methods disclosed herein can be configured to provide signal monitoring techniques that can perform predictive maintenance while also protecting users' private data using an appropriate encryption scheme. That is, sensitive data can be encrypted, and if need-be, transmitted to a processing center for analysis. The encrypted data can be analyzed and predictive maintenance judgments or determinations can be made without deciphering the sensitive data. Actions can be suggested and/or undertaken, based on the predictive maintenance judgments.

As alluded to above, embodiments are directed to privacy-aware systems and methods that can monitor certain properties or characteristics of a system over time, based on, for example, time-series data. For example, time-series data, such as operating conditions or characteristics of a vehicle (e.g., signals indicative of tire wear, such as tire pressure, fuel efficiency, and/or acceleration data) can be gathered and encrypted. Expected properties or system characteristics (e.g., a specification(s) or profile(s) indicative of one or more expected behaviors of the system) may also be encrypted. The specification(s) or profile(s) may comprise a threshold value(s) as well as logic or a condition(s) that characterizes what happens or what should happen when the threshold value(s) is met or exceeded (or not met). This can suggest that a future fault will occur in the system. An example of such a threshold may be a minimum tire pressure value of a vehicle.

The encrypted time-series data may be compared to the encrypted specification (either locally or at a remote server). Depending on whether or not the encrypted time-series data comports with the specification, actions can be undertaken and/or suggested in order to preemptively avoid the future fault. For example, the monitored tire pressure data from a vehicle may be approaching a minimum tire pressure value specified in the vehicle's operational specification. Upon a determination of this condition, a notification suggesting filling a tire with air and/or replacing the tire can be transmitted to the vehicle and/or user of the vehicle. This type of analysis can be accomplished without revealing who the user is and/or that the user may be non-optimally maintaining or operating his/her vehicle.

FIG. 1 illustrates an example high-level representation of a privacy-aware predictive maintenance system in accordance with various embodiments of the present disclosure. System 100 may include a user device 102 that can be monitored for predictive maintenance purposes. User device 102 may be embodied in or as a device, apparatus, system, etc. User device 102 may include one or more sensors, such as pressure sensors, accelerometers, cameras, or other data gathering devices for monitoring relevant operating conditions or characteristics of user device 102. User device 102 may be a personal device, such as a smartphone, tablet computer, laptop, or other similar device. In some embodiments, user device 102 may be a data gathering or data receiving device that can be a part of and/or used in conjunction with a larger user system 104 whose operating characteristics or conditions may be monitored.

Data regarding user device 102 and/or user system 104 may be encrypted and transmitted to a non-decrypting cloud service 106 for analysis. Non-decrypting cloud service 106 may comprise one or more servers, processors, or other processing entities. Data encryption can be performed by mapping to an encryption table (as will be discussed in greater detail below), although any method of encryption wherein the privacy of the data is maintained can be utilized. Examples of appropriate encryption schemes may include, but are not limited to a partially or fully homomorphic encryption scheme, or an order preserving encryption scheme (OPES). One or more of user device 102 and user system 104 may employ one or more known wired or wireless transmission mechanisms known to those of ordinary skill in the art for transmitting the encrypted data to non-decrypting cloud service 106. Non-decrypting cloud service 106 may also employ one or more known wired or wireless transmission mechanisms for transmitting information, such as predictive maintenance judgements, to user device 102 and/or user system 104.

Non-decrypting cloud service 106 can analyze the encrypted data from user device 102 and/or user system 104 without deciphering the encrypted data. For example, the data may be encrypted in accordance with an OPES. Accordingly, non-decrypting cloud service 106 may glean information based on the order of the encrypted data (ciphertext) without needing to know the underlying plaintext (the data in its unencrypted state). Depending on the information gleaned from the encrypted data, non-decrypting cloud service 106 may make a predictive maintenance judgment regarding user device 102 and/or user system 104. Based on that predictive maintenance judgment, non-decrypting cloud service 106 may notify user device 102 and/or user system 104 to undertake or perform some action. In some embodiments, a third-party may be notified.

It should be noted that privacy-aware data analysis has been an active area of research for various applications. For example, privacy-aware data analysis can be used in the context of smart energy meters. In this context, privacy-aware data analysis schemes focus on allowing a cloud-based service to infer properties of temporally or spatially aggregated data without the need to reveal user data. However, conventional privacy-aware data analysis is often concerned with the privacy-utility tradeoff, i.e., the amount of loss of private information that the user can tolerate in return for the utility obtained by sharing their encrypted data. The more distorted (more securely encrypted) the encrypted data is, the less information can be determined from the encrypted data, resulting in greater privacy being retained by the user.

Privacy-preserving aggregation of time-series data has been proposed for enabling a cloud server to learn aggregate statistics regarding the data, without being able to infer individual aspects or elements of the data. Moreover, privacy-preserving transformations have been proposed to inhibit the ability of an attacker to infer the properties of time-series data (such as statistical properties) from original data. Such privacy-preserving transformations may use various kinds of distortion functions.

As described below, various embodiments may utilize an OPES. Variations of OPES have been proposed for use in certain applications, such as for performing efficient range searches. However, various embodiments expand on conventional OPES by preserving logical properties of time-series data in a privacy-aware fashion, while comparing the time-series data to one or more operational specifications or profiles.

FIG. 2 is a flow chart illustrating example operations that can be performed to effectuate privacy-aware data analysis in accordance with various embodiments. At operation 200, time-series data representative of a characteristic of a system that has been encrypted according to an encryption scheme may be received. Time-series data can refer generally to data collected over some period of time, whether it be over a short period of time (e.g., over a period of a few seconds or minutes) or a long period of time (e.g., over a period of days, weeks, months or years). Time-series data may be some continuous value changing overtime. Examples of time-series data in the vehicle context can include data regarding vehicle usage, e.g., check engine signals, a vehicle's speed and/or acceleration profile, a vehicle's fuel consumption, data regarding catalytic degradation, etc.

In accordance with various embodiments in which time-series data is monitored, the encryption scheme may be an OPES-style encryption scheme. In accordance with various embodiments, the ciphertext representative of the time-series data can be compared with ciphertext representative of operational specification(s) or profile(s) data. The ciphertext has the same ordering/ordered relationship as the plaintext. Thus, the relationship between different instances of time-series data when encrypted remains the same as before the time-series data was encrypted. Additionally, the relationship between the different instances of time-series data and an operational specification or profile when encrypted remains the same as that before encryption. For example, if the plaintext value of an instance of time-series data is less than the plaintext value of specification data, the same will hold true of the respective ciphertext values.

It should be noted that other encryption schemes may be used, e.g., if the data being monitored or gathered is not time-dependent. That is, a specification (described in greater detail below) may not have or contain a temporal component (i.e., is agnostic as to time). For example, a specification may specify that "engine temperature should always remain below value x." In this case, engine temperature data can be processed, and the system will not necessarily need to consider time. The system may simply compare all received encrypted values to the encrypted value of "x" to determine if the engine temperature limit was ever exceeded.

Referring back to FIG. 1, and following the example set forth therein, time-series data may be data regarding user system 104, which may be a vehicle. User device 102 may be a vehicle monitoring system including one or more vehicle sensors monitoring one or more aspects of user system 104. The one or more vehicle sensors may include accelerometers, a speedometer, and oil pressure sensors. They may also include temperature sensors, tire pressure sensors, fuel mix sensors, and emission sensors. The one or more vehicle sensors may also include one or more processors adapted to record the above sensed information such as, for example, speeds reflected in the vehicle's speedometer in a memory unit, etc. User device 102 and user system 104 may communicate via a local network within user system 104, such as a vehicle bus utilizing one or more communications protocols, such as the Controller Area Network (CAN), Local Interconnect Network (LIN), etc. The manner in which user device 102 and/or user system 104 monitor and store vehicle data can vary depending on the type of data being monitored, as well as requirements or preferences regarding the monitoring of the data. For example, the aforementioned vehicle speed profile may comprise samples of a vehicle's speed taken for 10 seconds every 15 minutes over a period of one month. However, monitoring check engine signals may comprise querying a vehicle's onboard diagnostics system once a month over a period of a year.

At operation 202, the encrypted time-series data is compared with a specification indicative of one or more expected behaviors of the system. As described above, the specification may include a threshold or baseline value (which can be encrypted along with the time-series data) as well as, e.g., temporal logic or a set of conditions. The temporal logic or set of conditions may specify an expected behavior of the system involving the threshold or baseline value. For example, two fixed sample rate signals (X and Y) arising during vehicle operation may be of interest. An operating characteristic of the vehicle may be specified such that if the value of signal X goes above a value of "1" and remains above "1" for 10 seconds, signal Y should fall below the value of "0" for the next 10 seconds. Signal X may be considered to be time-series data that can encrypted and compared to specification data, which may be a temporal operational characteristic involving a threshold value represented by signal Y. In other words, encrypted time-series data can be compared to encrypted threshold data and analyzed in accordance with a specification in order to determine whether or not a system is operating as expected. It should be noted that the specification itself need not be encrypted.

It should be noted that conventional implementations of OPES-style encryption to preserve privacy during data analysis (or other privacy-preserving data analysis methods) do not provide a framework in which general logical properties involving temporal behaviors can be checked. Conventional privacy-preserving encryption schemes and data analysis are generally limited to determining whether certain encrypted data falls within a certain range, nothing more.

Accordingly, various embodiments analyze time-series data based on the aforementioned specification, or what can be referred to as a trigger function (or monitoring function). A specification can be defined a priori and may be known to both user device 102/user system 104 and the analyzing entity, e.g., non-decrypting cloud service 106. The specification can be based on one or more conditions provided in some form, such as a temporal logic formula, that, as alluded to previously, define expected system behaviors, along with a mechanism to predict when a fault will occur, based on the specifications. It should be noted that the creation of a specification need not rely on actual data or expected conditions. Rather, because various embodiments analyze encrypted data, a specification can be defined using, e.g., relative values and/or ranges.

The specifications may be created using a temporal logic formula, such as Signal Temporal Logic (STL). In some embodiments, a temporal logic formula may be a simple operational specification, such as an aforementioned threshold value and associated condition. In some embodiments, the temporal logic formula can be more elaborate, such as specifying one or more trends over multiple systems, e.g., accelerated tire wear is expected in 10 vehicles out of every 100 vehicles that are monitored.

The prediction mechanism may be based on methods for determining whether a monitored signal meets a particular property. The prediction mechanism may also be based on methods to determine robustness of system behaviors with respect to the specifications (e.g., using robust semantics for STL), along with statistical methods. For example, a predication mechanism may not only indicate whether or not the monitored signal meets the particular property, but "how well" the particular property is satisfied. That is, a predication mechanism may involve methods for determining not only whether a monitored signal exceeds or falls short of an operational threshold condition, but by how much the operational threshold condition is exceeded or missed. This can be accomplished by utilizing an encryption scheme that preserves, e.g., the relative difference(s) between data. For example, the speed of several vehicles may be monitored as they travel along a highway. A temporal logic formula may specify that each of the vehicles should remain above some minimum speed. If several vehicles violate this specification, then a monitoring system, such as a cloud-based monitoring system, may determine or conclude that traffic is congested. In one embodiment, a method of making such a determination can involve considering the average amount of the violation of the minimum speed specification. If the average minimum speed violation satisfies some threshold condition, the monitoring system can issue a warning to the vehicles of the congested traffic conditions. In this way, predictive maintenance judgments can be more accurate and/or better targeted to address a potential issue.

At operation 204, a determination can be made regarding whether the characteristics of the system comport with the one or more expected behaviors of the system based upon the comparison. Following the above example, if signal Y is monitored and is determined to fall to the value of "0" for the next 10 seconds, the vehicle is within its expected operational specification, and no further action is taken. If, however, signal Y is monitored and is determined not to fall to the value of "0" for the next 10 seconds, e.g., signal Y remains above the value of "1" and/or signal Y only falls to the value of "0" for only five seconds, predictive action can be suggested. It should be understood that the above-noted values may be ciphertext values.

Accordingly, at operation 206, one or more notifications may be output based upon the determination made in operation 204. That is, one or more alerts or notifications may be generated suggesting that certain action(s) be taken in response to the determination that the vehicle has fallen out of its specified operational range. The one or more alerts or notifications can be transmitted to the user device 102 and/or the user system 104.

The above-described method can be implemented in a variety of ways. One possible implementation contemplated herein is a batch processing-type architecture, which is illustrated and described with reference to FIG. 3. Another possible implementation contemplated herein is a continuous processing-type architecture that is illustrated and described with reference to FIG. 4.

In a batch processing-type architecture, packets of encrypted data, e.g., monitored signals or data regarding user device 102 and/or user system 104, can be sent to a processing entity. The processing entity can be a local processor, but in this example, the processing entity is a cloud-based server utilized by non-decrypting cloud service 106. Non-decrypting cloud service 106 may independently analyze each packet, and determine or generate a predictive maintenance judgment based on the analysis. Non-decrypting cloud service 106 may transmit the predictive maintenance judgment back to user device 102 and/or user system 104. User device 102 and/or user system 104, based on the predictive maintenance judgment, may generate an appropriate notification or alert. In some embodiments, non-decrypting cloud service 106 may generate the appropriate notification or alert, which may then be transmitted to user device 102 and/or user system 104. In some embodiments, non-decrypting cloud service 106 can also perform signal monitoring, where user device 102 and/or user system 104 merely act as signal or data relays.

Figure 3:
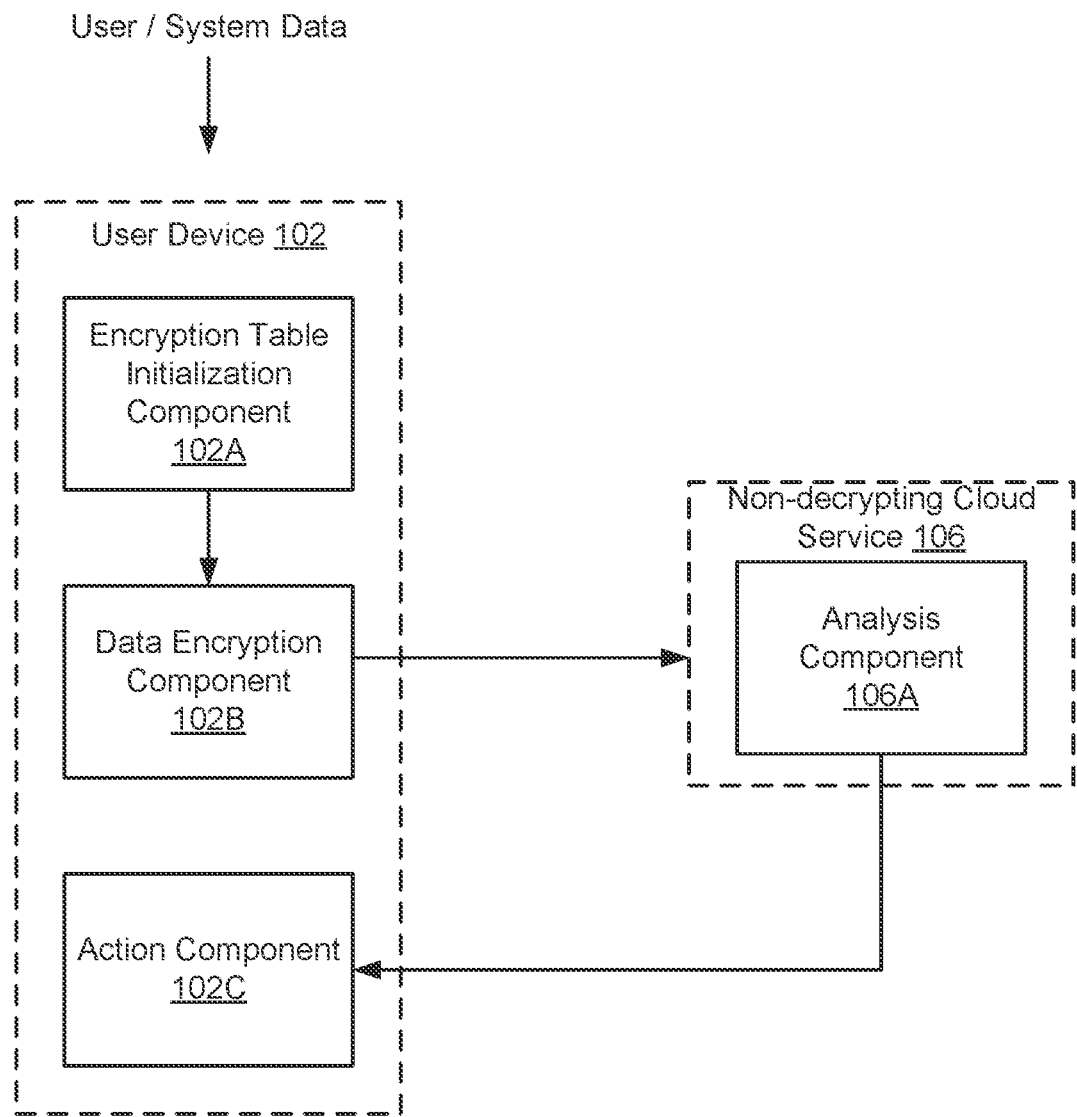
FIG. 3 is an example system architecture representative of a batch-processing privacy-aware predictive maintenance system in accordance with one embodiment of the present disclosure.
Figure 4:
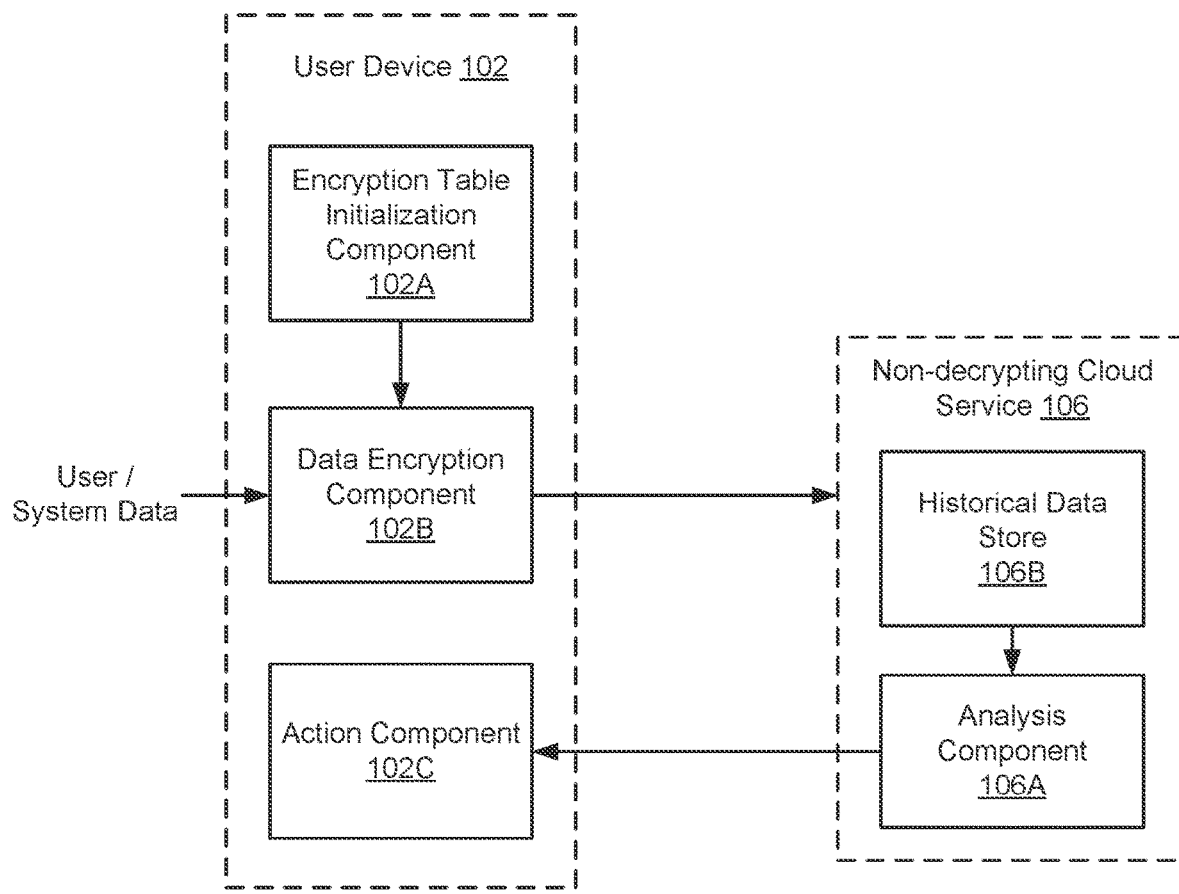
FIG. 4 is an example system architecture representative of a continuous-processing privacy-aware predictive maintenance system in accordance with one embodiment of the present disclosure.

Referring to FIG. 3, user device 102 may receive user or system data in the form of time-series data, e.g., a time-series sequence of signals indicative of the operational behavior of a vehicle. An encryption table initialization component 102A of user device 102 may initialize one or more encryption tables by creating a table that reflects the time-series sequence of signals and one or more specification constants. It should be noted that data structures other than a table may be generated and utilized in accordance with other embodiments. The specification constants may be a collection of constant values used to define an expected operational behavior of the vehicle. The encryption table may comprise a series of random values.

A data encryption component 102B of user device 102 may encrypt the user or system data. The user or system data may be encrypted by mapping values of the time-series sequence of signals to the series of random values making up the encryption table. It should be noted that the temporal and/or spatial order of the time-series sequence of signals is maintained with the mapping. That is, the mapping results in a distorted version of the time-series sequence of signals that retains the order of the original non-encrypted version of the time-series sequence of signals. The specification constants may be similarly encrypted.

Table 1 illustrates an example mapping of a time-series sequence of signal values to a randomized encryption table in accordance with one embodiment. For example, the time-series sequence of signals of data regarding user device 102 may comprise a plurality of acceleration values monitored during a 10 second time interval. The non-encrypted "plaintext" values indicative of acceleration (e.g., 0.3 f/s$^2$, 1.2 f/s$^2$, 1.4 f/s$^2$, and 2.1 f/s$^2$) are mapped to random values (e.g., 138, 140, 592, and 1002, respectively), while the original order (in terms of acceleration magnitude) is preserved. A specification constant, e.g., an acceleration threshold of 1.6 f/s$^2$ is also mapped to a random value, e.g., 600, where its relationship to the monitored time-series sequence of signals is also maintained. It should be noted that this example reflects the ability of the encryption scheme to maintain relative orders amongst the time-series data. In other embodiments, the random ordered values may also be selected to further maintain relative differences between the time-series data. That is, if the time-series data reflects magnitudes, for example, the random ordered values to which the time-series data are mapped may also reflect those same relative magnitudes.

TABLE 1

| User Data (Plaintext) | Random Ordered Values (Ciphertext) |
|---|---|
| 0.3 | 138 |
| 1.2 | 140 |
| 1.4 | 592 |
| 1.6 | 600 |
| 2.1 | 1002 |

The encrypted data in the encryption table may be sent to non-decrypting cloud service 106, which may comprise one or more servers, processors, etc. Non-decrypting cloud service may comprise an analysis component 106A that is adapted to analyze the encrypted data received from user device 102. In particular, analysis component 106A may compare the encrypted data representative of the time-series sequence of signals to the encrypted data representative of the specification constant. As previously noted, any specification constant(s) are made known to non-decrypting cloud service 106, as well as any relevant temporal logic formula(s) or conditions to facilitate this comparison. For example, non-decrypting cloud service 106 is aware of the acceleration threshold (and its encrypted value), as well as the condition that a vehicle's acceleration should not exceed that acceleration threshold more than once every during every 10 seconds of operation. Accordingly, analysis component 106A may analyze the encrypted time-series sequence of signals to determine whether or not a vehicle has experienced an acceleration that exceeds the threshold over a 10 second period of time. It should be appreciated that this analysis can be performed without deciphering any of the encrypted data because the order of the encrypted data is the same as that of the non-encrypted data.

Non-decrypting cloud service 106 may transmit information regarding the results obtained by analysis component 106A to an action component 102C of user device 102, such as a predictive maintenance judgment. Action component 102C may generate one or more notifications, alerts, and/or other messages that can inform user device 102 of a suggested course of action in view of the predicative maintenance judgment. Following the above example, action component 102C may generate an alert that can be presented by user device 102 to its user. For example, the alert may be a notification that the user should curb excessive acceleration, take his/her vehicle in for maintenance prior to any ordinarily scheduled maintenance to address increased vehicle wear-and-tear due to excessive acceleration, etc. In some embodiments, "raw" results obtained by analysis component 106A may be sent to action component 102C, where action component 102C may generate a predictive maintenance judgement as well. It should be noted that information generated by and/or results obtained by analysis component 106A may be sent either as plaintext data or may be encrypted in accordance with a "traditional" encryption scheme, such as symmetric key encryption.

It should be noted that user device 102 and non-decrypting cloud service 106 are delineated with hashed outlines. This is because the analysis component 106A, although illustrated and described above, as being part of non-decrypting cloud service 106, may instead be implemented as part of user device 102 (or user system 104).

In a continuous processing-type architecture, a continuous stream of data may be received, encrypted, and processed.

For example, a continuous stream of encrypted data packets, e.g., monitored signals or data regarding user device 102 and/or user system 104, can be sent to, in this example, non-decrypting cloud service 106. The analysis of the encrypted data may be an ongoing process, and can involve the storage of and comparison to, historical data representative of a vehicle's history of operation.

In contrast to the batch processing-type architecture described above, encryption table initialization component 102A may generate an encryption table prior to the receipt of any time-series data. For example, it may be known that a vehicle's acceleration profile will not result in values that exceed 3 ft/s$^2$, nor will it result in values that fall below 0 ft/s$^2$. Based on this knowledge, encryption table initialization component 102A may generate an encryption table that randomly quantizes all possible or foreseeable values between 3 ft/s$^2$ and 0 ft/s$^2$.

Data encryption component 102B may receive the continuous stream of data regarding user device 102 and/or user system 104. Each instance of data that is received can be mapped to an appropriate value of the encryption table, where, again the ordered relationship is maintained. The encrypted data, along with any encrypted specification constant(s), may be transmitted to non-decrypting cloud service 106 to be processed.

Analysis component 106A may process (e.g., compare) incoming encrypted data against an encrypted specification constant(s) to determine or generate a predictive maintenance judgment based on the analysis. It should be noted that a specification constant(s) may be relevant over any time period (as opposed to a current time period per the batch processing-type analysis). It should also be noted that historical (encrypted) data may be stored in historical data store 106B. For example, the relevant temporal logic formula or condition and/or the prediction mechanism may involve a determination regarding past operational characteristics. That is, analysis component 106A may need to determine one or more values indicative of an operational characteristic over the lifetime of the vehicle. Hence, specifications over an unbounded time period can be considered using the continuous processing-type architecture. Accordingly, depending on the monitored operational characteristic and/or the predictive maintenance judgment to be made, analysis component 106A may at times, retrieve or access historical data store 106B for relevant historical data.

Similar to the batch processing-type architecture, non-decrypting cloud service 106 may transmit information generated by or results obtained by analysis component 106A to an action component 102C of user device 102. Action component 102C may generate one or more notifications, alerts, and/or other messages that can inform user device 102 of a suggested course of action in view of the information or results. Action component 102C may generate an alert that can be presented by user device 102 to its user. As before, the information and/or results from analysis component 106A may be sent either as plaintext data or may be encrypted in accordance with a "traditional" encryption scheme, such as symmetric key encryption.

It should be noted that although predictive maintenance and signal monitoring may be described in the context of vehicle servicing, various embodiments can be adapted for use in other contexts. For example, predicative maintenance and signal monitoring may be utilized for mitigating traffic congestion. That is, a vehicle fleet monitoring system can be configured in accordance with various embodiments so that traffic jam situations can be predicted. When a traffic jam is predicted, the vehicle fleet monitoring system may issue fleet-wide warnings and suggestions for rerouting the vehicles. To make such predictions, vehicle fleet monitoring system may gather fleet-wide configuration information, such as vehicle locations, without revealing, e.g., the users associated with the vehicles whose locations are determined.

As previously noted, user device 102 and non-decrypting cloud service 106 are delineated with hashed outlines. This is because the analysis component 106A, although illustrated and described above, as being part of non-decrypting cloud service 106, may instead be implemented as part of user device 102 (or user system 104).

Various embodiments may be used in the medical field, where a pacemaker may monitor a patient's heart rate. Time-series data (the patient's heart data monitored over some period of time) may be transmitted by the pacemaker to a remote server or processor in order to be analyzed so that dangerous pulmonary conditions may be predicted. Not surprisingly, patients' utilizing such pacemakers would want to have their heart data kept private. The use of a predictive maintenance and signal monitoring system configured in accordance with various embodiments would allow for such privacy.

Yet another context in which various embodiments may be utilized is in the context of fitness tracking. For example, predictive maintenance and signal monitoring can be utilized in a fitness tracking system to estimate when a user will be asleep in order to silence smart phone notifications that could disrupt the user. To protect against criminals utilizing sleep patterns to determine when potential victims are asleep and vulnerable to robberies, the fitness tracking system keeps the association between users and actual sleep times encrypted and non-decipherable.

Further still, the signal monitoring technology disclosed herein can be used for applications other than predictive maintenance, such as performing control tasks or for simply providing information to the user. For example, a temporal logic specification may, based on acceleration and braking data, predict when a vehicle is in an urban environment. If the vehicle is determined to satisfy this specification, a control signal can be sent to the vehicle to place it into an "ecological" mode (e.g., a mode that provides more fuel efficiency by softening the vehicle's acceleration profiles).

Figure 5:
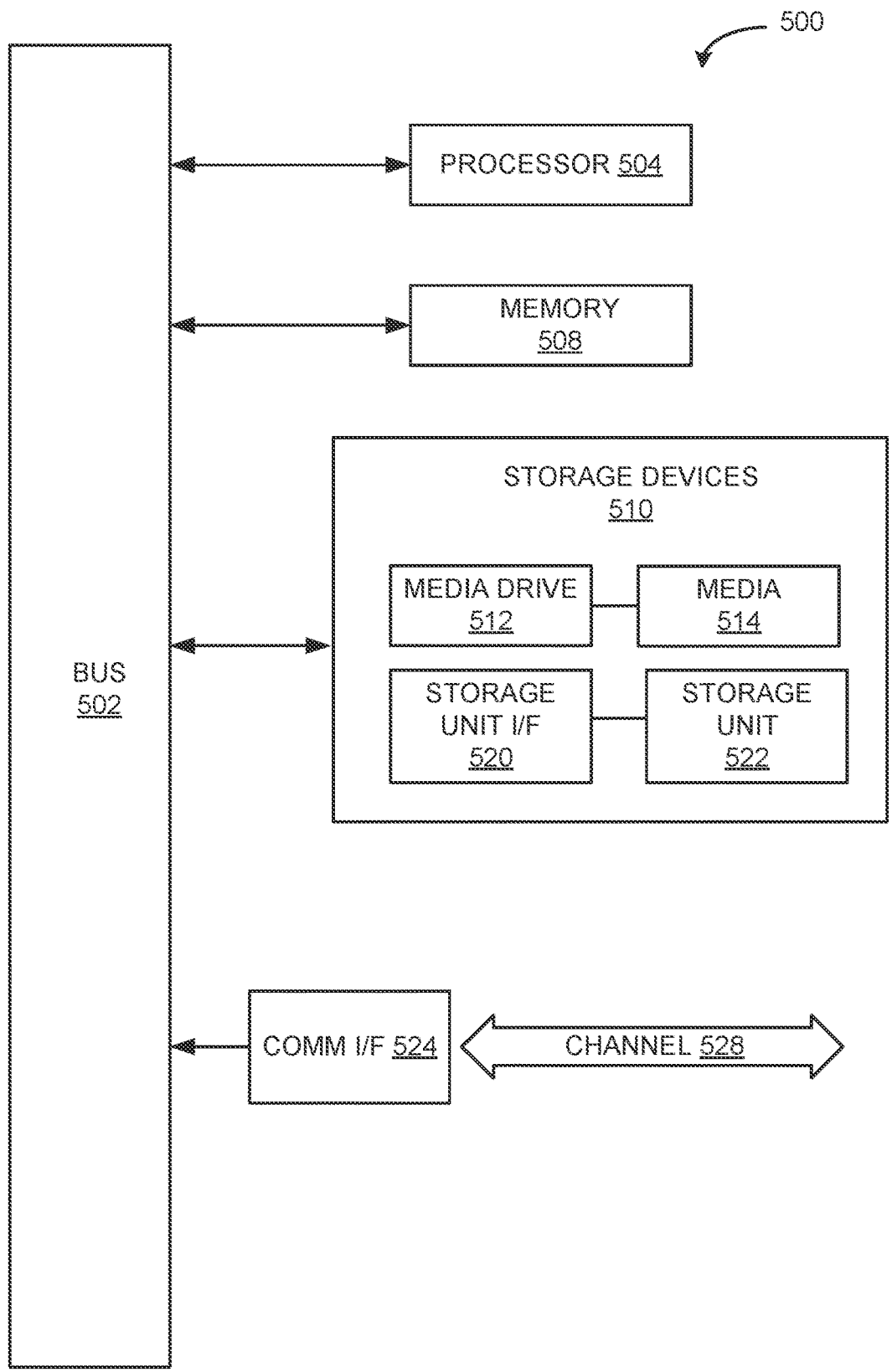
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up user device 102, user system 104, and non-decrypting cloud service 106. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    receiving encrypted time-series data comprising one or more values associated with one or more signals generated by a system, wherein the encrypted time-series data is representative of a characteristic of the system;
    comparing the encrypted time-series data with a specification indicative of predictive maintenance of the system, wherein ordering of the specification maintains a relationship with ordering of the encrypted time-series data to implement the comparison without decrypting any of the encrypted time-series data;
    determining, based upon the comparison, whether the characteristic of the system comports with the predictive maintenance of the system without decrypting any of the encrypted time-series data or a result of the comparison; and
    outputting one or more notifications based upon the determination.

2. The method of claim 1, wherein the encrypted time-series data has been encrypted according to an encryption scheme, and wherein the encryption scheme comprises mapping sequence of values to a plurality of random values.

3. The method of claim 2, wherein the encryption scheme comprises an order preserving encryption scheme.

4. The method of claim 1, wherein the encrypted time-series data are monitored over a period of time.

5. The method of claim 1 further comprising: transmitting the encrypted time-series data to a non-decrypting cloud server in batches of encrypted packets.

6. The method of claim 1 further comprising: continuously transmitting the encrypted time-series data to a non-decrypting cloud server as a stream of encrypted time-series data.

7. The method of claim 1, wherein the encrypted time-series data is encrypted by a user device adapted to monitor one or more operating characteristics of a vehicle.

8. A method comprising:
    receiving encrypted time-series data comprising one or more values associated with one or more signals generated by a system, wherein the encrypted time-series data is representative of a characteristic of the system;
    comparing the encrypted time-series data with a specification indicative of one or more expected behaviors of the system, wherein one or more threshold values set forth in the specification are encrypted by mapping the one or more threshold values to other random values of a plurality of random values;
    determining, based upon the comparison, whether the characteristic of the system comports with the one or more expected behaviors of the system without decrypting any of the encrypted time-series data or a result of the comparison; and
    outputting one or more notifications based upon the determination.

9. The method of claim 8, wherein an ordered relationship between each of the sequence of values and the one or more threshold values is maintained after encryption.

10. A system comprising one or more components adapted to:
    receive encrypted time-series data comprising one or more values associated with one or more signals generated by a system, wherein the encrypted time-series data is representative of a characteristic of the system;
    compare the encrypted time-series data with a specification indicative of predictive maintenance of the system, wherein ordering of the specification maintains a relationship with ordering of the encrypted time-series data to implement the comparison without decrypting any of the encrypted time-series data;
    determine, based upon the comparison, whether the characteristic of the system comports with the predictive maintenance behaviors of the system without decrypting any of the encrypted time-series data or a result of the comparison; and
    output one or more notifications based upon the determination.

11. The system of claim 10, wherein the encrypted time-series data has been encrypted according to an encryption scheme, and wherein the encryption scheme comprises mapping sequence of values to a plurality of random values.

12. The system of claim 11, wherein the encryption scheme comprises an order preserving encryption scheme.

13. The system of claim 10, wherein the encrypted time-series data are monitored over a period of time.

14. The system of claim 10, wherein the one or more components are further adapted to: transmit the encrypted time-series data to a non-decrypting cloud server in batches of encrypted packets.

15. The system of claim 10, wherein the one or more components are further adapted to: continuously transmit the encrypted time-series data to a non-decrypting cloud server as a stream of encrypted time-series data.

16. The system of claim 10, wherein the encrypted time-series data is encrypted by a user device adapted to monitor one or more operating characteristics of a vehicle.

17. A system comprising one or more components adapted to:
- receive encrypted time-series data comprising one or more values associated with one or more signals generated by a system, wherein the encrypted time-series data is representative of a characteristic of the system;
- compare the encrypted time-series data with a specification indicative of one or more expected behaviors of the system, wherein one or more threshold values set forth in the specification are encrypted by mapping the one or more threshold values to other random values of a plurality of random values;
- determine, based upon the comparison, whether the characteristic of the system comports with the one or more expected behaviors of the system without decrypting any of the encrypted time-series data or a result of the comparison; and
- output one or more notifications based upon the determination.

18. The system of claim 17, wherein an ordered relationship between each of the sequence of values and the one or more threshold values is maintained after encryption.

\* \* \* \* \*